July 23, 1957  J. T. BERGEN  2,800,148
LOOM PICKER
Filed March 28, 1955
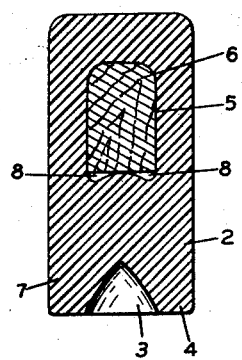
INVENTOR
JAMES T. BERGEN
ATTORNEY

United States Patent Office 2,800,148
Patented July 23, 1957

2,800,148

LOOM PICKER

James T. Bergen, Lancaster Township, Lancaster County, Pa., assignor to Armstrong Cork Company, Lancaster, Pa., a corporation of Pennsylvania Application March 28, 1955, Serial No. 497,280

2 Claims. (Cl. 139—159)

This invention relates to a loom picker, and more particularly to a loom picker in which the recess for the loom picker bar is of such design that the bar does not contact the entire surface of the picker bar recess on the surface of the recess in juxtaposition to the shuttle-engaging face of the picker.

In the manufacture of plastic loom pickers, it has been common practice to produce them with the picker bar recess conforming to the cross-sectional shape of that portion of the picker bar which is positioned in the recess. The picker bar recess surface juxtaposed to the shuttle-engaging face of the picker is relatively flat, with sharp angles where it joins the sides of the picker bar recess. These sharp angles have been found to function as points of stress accumulation concentrating a large amount of stress at these two very small points, resulting in considerable weakening, and in many instances breakage of plastic pickers during relatively long continuous periods of usage.

It has been found that this stress accumulation can be greatly alleviated by avoiding the sharp angles in the picker bar recess and by designing the picker bar recess in such manner that the picker bar does not engage the surface of the recess throughout the entire area of the surface in juxtaposition to the shuttle-engaging surface. This results in a structure in which the stresses are not concentrated in sharp angles at the points where the surface of the recess in juxtaposition to the shuttle-engaging surface joins the sides of the picker bar recess, and also in which the picker bar engages only a portion of the surface between the two angles. This has been found to greatly diminish this stress accumulation, and a more satisfactory picker has resulted.

An object of this invention is to provide a picker in which the picker bar recess is designed with a convex surface wtih respect to the recess on the side in juxtaposition to the shuttle-engaging face of the picker.

Another object of this invention is to provide a picker in which the picker bar recess has angles of relatively large radius at the points where the surface of the recess in juxtaposition to the shuttle-engaging face joins the sides of the picker bar recess.

In order that the invention may be more readily understood, it will be described in connection with the attached drawing, in which there is shown a loom picker 2 having a shuttle-receiving recess 3 in the face 4 thereof. The picker is provided with a picker bar recess 5, into which the picker bar 6 is positioned. The picker bar 6 is shown by suitable crosshatching to designate that the picker bar is made of a different material than the picker. The surface of the picker bar recess 5 in juxtaposition to the shuttle-engaging face of the picker is convex, as designated by the numeral 7. This convex surface 7 does not conform to the contour of the picker bar 6, leaving open areas 8 at the corners of the picker bar recess in which the bar does not engage the material of the picker. The points of juncture between the picker bar recess surface in juxtaposition to the shuttle-engaging face and the sides of the picker bar recess are on a relatively large radius to eliminate the sharp angle formation, which has been found to present an area for the build up of stress.

With a structure of this type, when the picker bar swings the picker into engagement with the shuttle in the recess 3, the force of the picker bar on the picker is concentrated at point 7, which is an elongated area in the middle of the face of the picker; however, there is no force exerted in the areas 8. In addition to this feature, the corners 8 are rounded on a larger radius than the radius customarily used for this purpose to distribute the stresses over a larger area. These stresses may result not only from the forces acting laterally along the major axis of the picker but also from the transverse forces occasioned by slight misalignment of the central axis of the picker and the shuttle at the moment of impact. Such transverse forces tend to cause the picker to rotate, in the plane of the figure, about the center of the picker bar; the resulting bending and shearing stresses likewise will become smaller at points 8 as the radius at these points is increased. This structure greatly relieves the stress on the points 8 and prevents breakage of the picker in this area.

The structure set forth herein has been found satisfactory in commercial installations and has greatly relieved the damage which has resulted from stresses concentrating at the sharp corners of the recess in which the picker handle is positioned.

I claim:

1. In a loom picker to engage and drive a shuttle across a loom, a resilient plastic body portion having a recess on one side of its exterior surface to engage the point of a shuttle, said plastic body portion being provided with an opening passing therethrough to receive the loom picker bar, and a rectangularly shaped picker bar placed in said opening, the opening in said picker comprising three flat sides for full engagement by three sides of the picker bar, said flat sides being joined to one another at right angles and the fourth side of the opening juxtaposed to said shuttle-engaging recess being convex with respect to the opening so that the picker bar engages a portion only of the plastic body on the side which receives the blow.

2. In a loom picker to engage and drive a shuttle across a loom, a resilient plastic body portion having a recess on one side of its exterior surface to engage the point of a shuttle, said body portion being provided with an opening passing therethrough to receive the loom picker bar, and a picker bar shaped to fit the sides of said opening over a majority of the exposed area of the opening, said picker bar being placed in said opening, the opening being so designed that the picker bar engages a portion only of the plastic body on the side which receives the blow.

References Cited in the file of this patent

UNITED STATES PATENTS

| 994,807 | Wattie | June 13, 1911 |

FOREIGN PATENTS

| 18,839 | Great Britain | of 1893 |